US005179636A

United States Patent [19]

Anzai

[11] Patent Number: 5,179,636

[45] Date of Patent: Jan. 12, 1993

[54] RECORDING APPARATUS

[75] Inventor: Katsuhiko Anzai, Ichihara, Japan

[73] Assignee: Canon Kabushiki Kaisha, Tokyo, Japan

[21] Appl. No.: 899,142

[22] Filed: Jun. 17, 1992

Related U.S. Application Data

[63] Continuation of Ser. No. 639,419, Jan. 10, 1991, abandoned, which is a continuation of Ser. No. 317,810, Mar. 2, 1989, abandoned.

[30] Foreign Application Priority Data

Mar. 8, 1988 [JP] Japan ................................ 63-54619

[51] Int. Cl.[5] .............................................. G06F 3/12

[52] U.S. Cl. .................................... 395/111; 395/112

[58] Field of Search ............................... 364/518-520; 395/110-112, 137, 148; 271/2, 184, 185, 225

[56] References Cited

U.S. PATENT DOCUMENTS

| | | | |
|---|---|---|---|
| 4,229,113 | 10/1980 | Anderson et al. | 400/596 |
| 4,407,597 | 10/1983 | Kapp | 400/625 |
| 4,473,314 | 9/1984 | Imaizumi | 400/625 |
| 4,635,212 | 1/1987 | Hatazawa | 364/519 X |
| 4,656,602 | 4/1987 | Berkland et al. | 364/519 X |
| 4,707,715 | 11/1987 | Miura | 346/160 |
| 4,754,428 | 6/1988 | Schultz et al. | 364/519 X |
| 4,797,832 | 1/1989 | Axelrod et al. | 364/464.02 X |
| 4,843,405 | 6/1989 | Morikawa et al. | 364/521 X |
| 4,860,119 | 8/1989 | Maniwa et al. | 358/296 |
| 4,893,257 | 1/1990 | Dominquez, Jr. et al. | 364/519 |
| 4,931,960 | 6/1990 | Morikawa | 364/519 |

FOREIGN PATENT DOCUMENTS

| | | | |
|---|---|---|---|
| 038220A2 | 10/1981 | European Pat. Off. . | |
| 138353A2 | 8/1984 | European Pat. Off. . | |
| 179292A | 4/1986 | European Pat. Off. | 364/519 |
| 227116A2 | 12/1986 | European Pat. Off. . | |
| 104794A1 | 4/1982 | Fed. Rep. of Germany . | |
| 327270A1 | 2/1984 | Fed. Rep. of Germany . | |
| WO87/06531 | 11/1987 | PCT Int'l Appl. . | |
| 159100A | 11/1985 | United Kingdom . | |

OTHER PUBLICATIONS

English language translation of official letter accompanying Office Action dated Aug. 3, 1989 in corresponding German application.

*Primary Examiner*—Gary V. Harkcom
*Assistant Examiner*—Mark K. Zimmerman
*Attorney, Agent, or Firm*—Fitzpatrick, Cella, Harper & Scinto

[57] ABSTRACT

A recording apparatus having a feeder for feeding recording sheets, a recording device to record onto a recording sheet fed by the feeder in an orientation of a portrait or a landscape and a controller to control the orientation of the recording device based on a manually-set or predetermined orientation.

16 Claims, 4 Drawing Sheets

RECORDING APPARATUS

This application is a continuation of application Ser. No. 07/639,419 filed Jan. 10, 1991, now abandoned; which is a continuation of Ser. No. 07/317,810 filed Mar. 2, 1989, now abandoned.

BACKGROUND OF THE INVENTION

1. Field of the Invention .

The present invention relates to a recording apparatus which can record in a plurality of directions.

2. Related Background Art

In a page printer, it is necessary to set a printing direction (orientation) to a conveying direction of a paper. In the basic command system of a conventional page printer, a changeover command of the orientation exists and the orientation can be switched to a portrait or a landscape from the host side by using the changeover command. Or, by making a switch on an operation panel 4 on the host side function, the orientation can be set by the menu system.

FIG. 7 shows an arrangement of a conventional page printer. Reference numeral 50 denotes a printer to record onto a recording paper and 5 indicates a host or host computer to generate information to be recorded by the printer 50.

In the printer 50, reference numeral 2 denotes an output unit to record onto the recording paper. In the conventional apparatus, the output unit 2 has three kinds of paper feeding mechanisms: that is, a regular size cassette paper feeding mechanism, a manual paper feeding mechanism, and an envelope paper feeding mechanism as an optional paper feeding mechanism. Reference numeral 3 denotes a memory to store information which is output from the host 5. The memory 3 has a bit map memory to store the information to be recorded by the output unit 2. A control circuit 15 reads out the information to be recorded by the output unit 2 from the memory 3 in accordance with the designated orientation.

On the other hand, reference numeral 4 denotes the operation panel. An operator inputs instructions to the host 5 and printer 50 by the operation panel 4. Reference numeral 10 denotes a paper feed changeover switch to change over the paper feeding mode of the printer 50.

In the case where the command system of a line printer is emulated by the page printer, the printing by the portrait fundamentally becomes a prerequisite.

In the page printer having two command systems such as portrait and landscape, in the case of providing, for instance, the envelope paper feeding mechanism in addition to the regular size cassette paper feeding mechanism, the paper conveying method is decided such that the short side of an envelope is set to the head position in a manner similar to the case of the other papers because of the format of the envelope and the structure of the printer.

However, in the conventional apparatus, when printing information onto an envelope based on the English specifications, in spite of the fact that the inherent object can be accomplished only when the information is printed in the landscape mode, the ordinary orientation is set in the portrait mode. Therefore, the operator first sets the optional paper feeding mechanism by operating the paper feed changeover switch 10 on the operation panel 4, thereby selecting an envelope paper feed cassette. Further, it is necessary to set the orientation to landscape by the menu system mentioned above by using the operation panel 4. Therefore, there is a drawback such that the two kinds of operations must be performed and the operations become complicated.

SUMMARY OF THE INVENTION

It is an object of the present invention to solve the foregoing problems.

Another object of the invention is to improve a recording apparatus.

Still another object of the invention is to provide a recording apparatus having a good operating performance.

Still another object of the invention is to provide a recording apparatus which changes the orientation as necessary even if no instruction is made from an operator.

Still another object of the invention is to provide a recording apparatus which changes the orientation in accordance with the kind of recording paper.

Still another object of the invention is to provide a recording apparatus in which, in the case of recording onto an envelope, the orientation is set to the landscape even if a change of orientation is not instructed by an operator.

Still another object of the invention is to provide a recording apparatus in which the proper orientation is determined in accordance with a command system.

The above and other objects and features of the present invention will become apparent from the following detailed description and the appended claims with reference to the accompanying drawings.

BRIEF DESCRIPTION OF THE DRAWINGS

FIG. 3 is a flowchart for a bold arrow 12 in FIG. 2;

FIG. 4 is a flowchart for a thin arrow 10

FIG. 5 is a flowchart for bold arrows 11 and 13 in FIG. 2;

FIG. 6 is a flowchart for a bold arrow 14 in FIG. 2;

DETAILED DESCRIPTION OF THE PREFERRED EMBODIMENTS

In the embodiment, two orientations of the portrait and landscape are provided. When an operator selects special paper feeding means, a control circuit 1 automatically designates the orientation to either portrait or the landscape. Due to this, any work to manually designate the orientation in addition to the paper feeding means is omitted.

Figure 8:
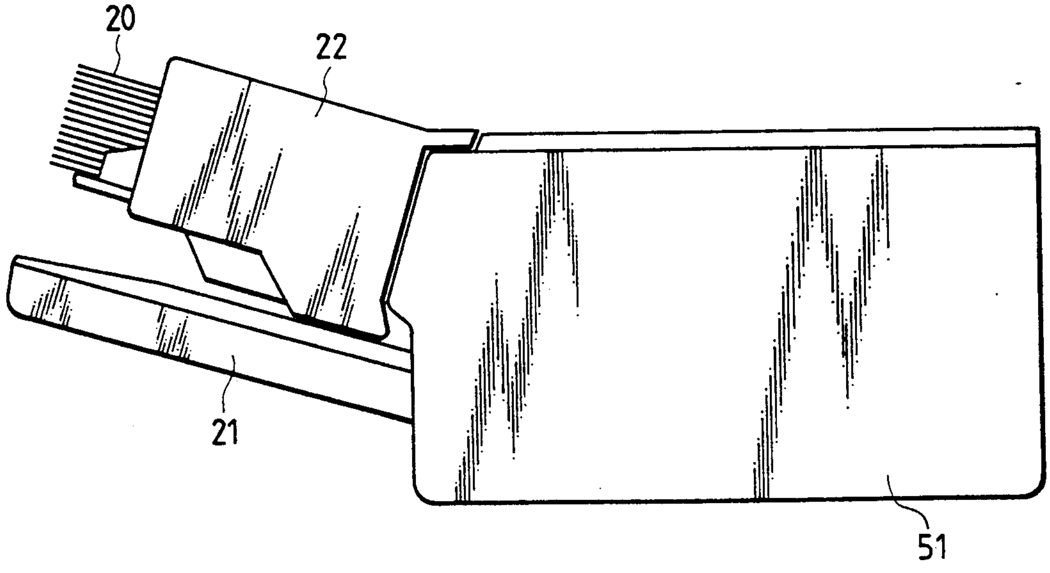
FIG. 8 an external view of a page printer having an envelope feeder.

FIG. 8 shows an external view of a page printer having an envelope feeder. Reference numeral 51 denotes a printer main body; 20 indicates envelopes; 21 is a cassette on which recording papers of the regular size are put; and 22 an envelope feeder. The cassette 21 and envelope feeder 22 are detachably attached to the printer main body 51.

Figure 1:
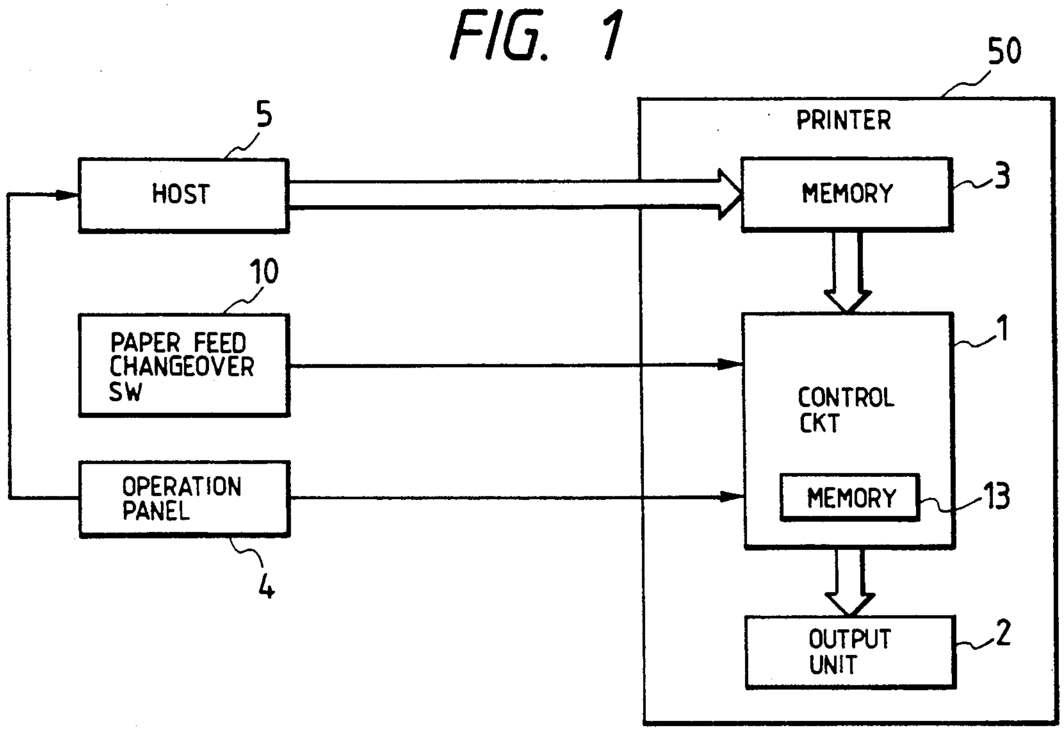
FIG. 1 is a diagram showing an arrangement of an embodiment;.
Figure 7:
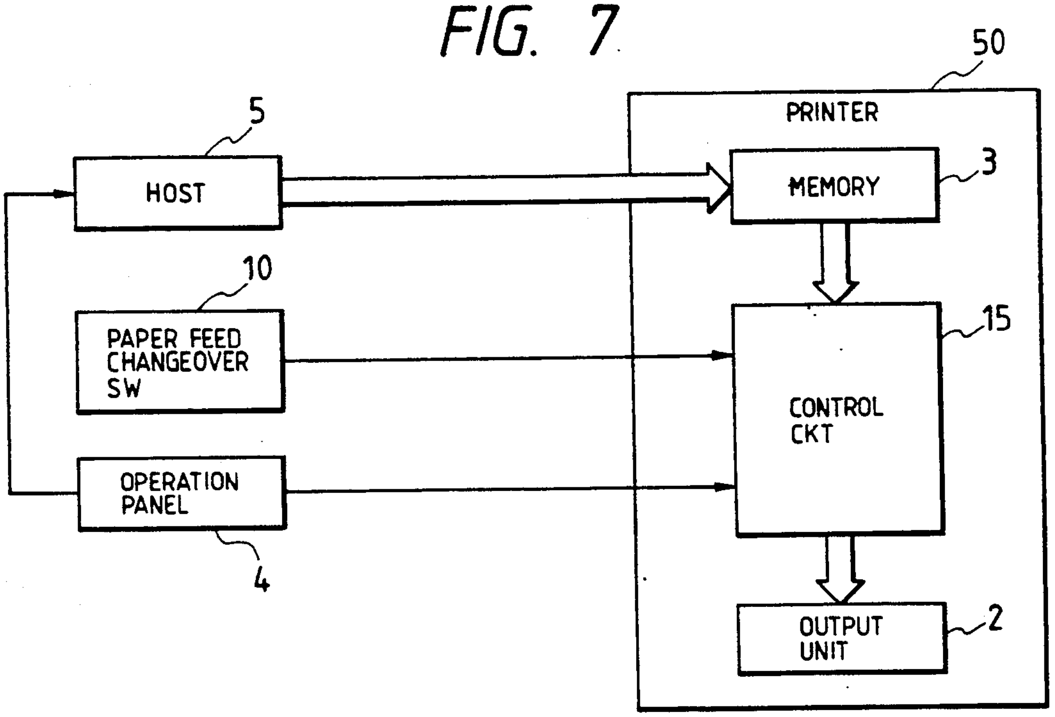
FIG. 7 is a diagram showing an arrangement of a conventional apparatus.

FIG. 1 shows an arrangement of the embodiment of the invention. The parts and components which are common to those in the conventional apparatus shown in FIG. 7 are designated by the same reference numerals. Reference numeral 50 denotes the page printer for recording onto a recording paper. For instance, a laser beam printer is used. Reference numeral 5 denotes the host or host computer to generate information to be recorded by the printer 50. For instance, a personal computer, work station, word processor, or the like is used.

In the printer 50, reference numeral 2 denotes the output unit to record onto a recording paper. In the embodiment, the output unit 2 also has three kinds of paper feeding mechanisms similarly to the conventional apparatus. That is, the output unit 2 has the regular size cassette paper feeding mechanism (21 in FIG. 8), the manual paper feeding mechanism, and envelope paper feeding mechanism (22 in FIG. 8) as an optional paper feeding mechanism. Reference numeral 3 denotes the memory to store the information which was output from the host 5. The memory 3 has a bit map memory for developing the code information generated from the host 5 into a bit map and for storing. On the other hand, a memory 13 provided for the control circuit 1 stores data and a program which are necessary for the operation of the control circuit 1. That is, the memory 13 stores the orientation and the like designated by the operation panel 4 of the host or by the paper feed changeover switch 10. The control circuit 1 reads out information to be recorded by the output unit 2 from the memory 3 in accordance with the orientation designated by the operation panel 4 or paper feed changeover switch 10.

On the other hand, reference numeral 4 denotes the operation panel. The operator can indicate the orientation of the printer 50 by the operation panel 4. The operator can also instruct the host 5 to output data to be recorded by the printer 50. Reference numeral 10 denotes the paper feed changeover switch to switch the paper feeding mode of the printer 50.

In the embodiment whose construction is shown in FIG. 1, the orientation can be also be designated by the switch 10. That is, the embodiment relates to the designation of the orientation in the case where the envelope feeder is provided as an optional paper feeding mechanism. Namely, in the case where the envelope feeder is selected as the paper feeding mode when an emulation command is generated, the orientation is set to landscape.

Figure 2:
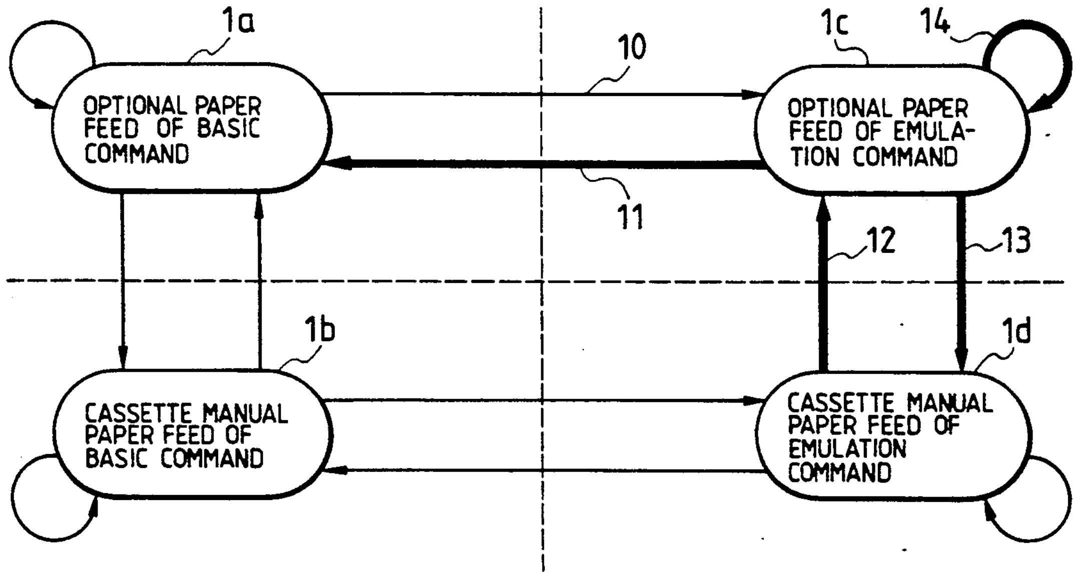
FIG. 2 is a diagram showing a state transition between a command mode and a paper feeding mode.

FIG. 2 diagrammatically shows a state transition with respect to the embodiment of the invention.

In FIG. 2, the state is divided into four states: an optional paper feeding state 1*a* and a cassette manual paper feeding state 1*b* of the basic command system in which the apparatus operates as a page printer; and an optional paper feeding state 1*c* and a cassette manual paper feeding state 1*d* of the emulation command system in which the apparatus operates as a line printer. State transitions indicated by bold arrows 11 to 14 are accompanied with the processes such as preservation, return, cancel, and the like of the orientation when the state is shifted due to respective factors (command mode changeover (11) and paper feeding mode changeover (12 to 14)).

The embodiment relates to the processes upon transitions between the state 1*c* and the states 1*a* and 1*b*.

In the printer 50, the recording position of characters is designated on a line unit basis from the host 5 in the case of the emulation command system. On the other hand, the printer 5 records at the position designated on a line unit basis. Therefore, even when the printer 5 is used as a page printer, the operator can handle the printer as if it was a line printer. On the other hand, in the case of the basic command system, the recording position of characters can be designated to a desired position from the host 5.

Figure 3:
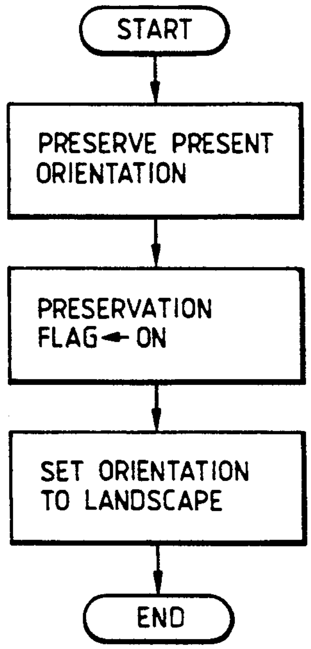
FIGS. 3 to 6 are flowcharts for the embodiment.

The bold arrow 12 shows the transition from the state 1*d* to the state 1*c* and relates to the case where the paper feeding mode changes from the "cassette manual paper feed" to the "optional paper feed" in the emulation command system. Such a change can be instructed from the operation panel 4 of the host 5 by the menu form. On the other hand, such a change can also be instructed by the paper feed changeover switch 10. In this case, since the system is the emulation command system, when the paper feeding mode is changed to the optional paper feeding mode, the control circuit 1 preserves the present orientation into the memory 13 and sets a preservation flag to 1. By preserving the present orientation, when the paper feeding mode is returned to the inherent cassette manual paper feeding mode, the orientation can be also returned to the original orientation. If a plurality of cassettes are installed, a preservation area may be also provided for every cassette. The orientation is set to the landscape (flowchart of FIG. 3).

Figure 5:
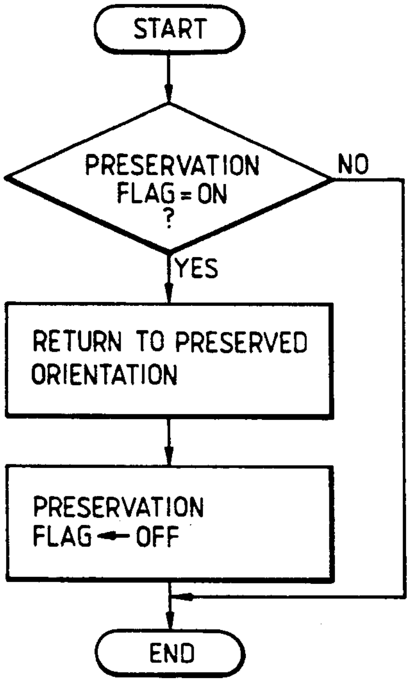

The bold arrow 13 shows the operation opposite to that in the case of the bold arrow 12 and relates to the transition from the optional paper feeding state 1*c* to the cassette manual paper feeding state 1*d*. In this case, if the preservation flag has been set to 1, the orientation is switched to the preserved orientation. Then, the preservation flag is turned off. If the preservation flag is not set to 1, the present orientation is held (flowchart of FIG. 5).

As explained above, in the embodiment, when the change of the paper feeding mode is instructed by the operator, even if the change of the orientation is not indicated by the operator, the orientation is changed. Therefore, it is sufficient that the operator merely instructs the change of the paper feeding mode. There is no need to further perform the work to indicate the change of the orientation.

The bold arrow 11 shows the case where in the optional paper feeding mode, the command mode is changed from the emulation command system to the basic command system by the menu operation or the like. In this case, if the preservation flag has been set to 1 the control circuit 1 returns the orientation to the preserved orientation and then returns the command system. If no orientation is preserved, the present orientation is held (flowchart of FIG. 5).

Figure 4:
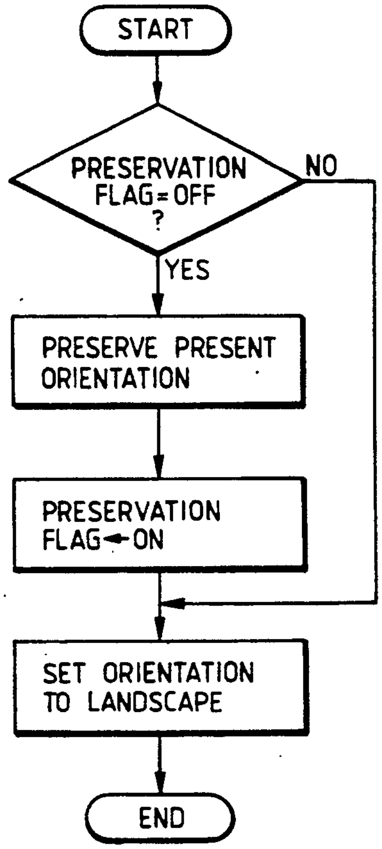

The thin arrow 10 relates to the case where the command mode is changed from the basic command system to the emulation system without changing the paper feeding mode. In the basic command system, the orientation is not always set to landscape. Therefore, as shown by the bold arrow 14, if the preservation flag has been set to 1, since the orientation has already been preserved in the memory 13, a new orientation is not preserved. However, if the preservation flag is set to 0, the present orientation is preserved and the preservation flag is set to 1. Thereafter, the orientation is set to the landscape. Due to this, in the case of the optional paper feeding mode in the emulation command mode, the orientation can be certainly set to the landscape (flowchart of FIG. 4).

Figure 6:
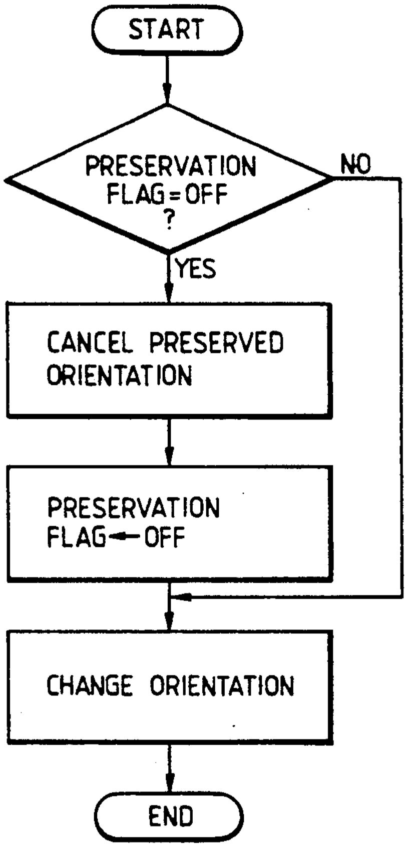

On the other hand, in the optional paper feeding mode in the emulation command mode, when the orientation was automatically set to the landscape, if the operator wants to print in the portrait mode, the orientation can be forcedly returned to the portrait mode by manually operating the operation panel 4. That is, if the preservation flag has been set to 1, namely, if the orientation has already been preserved, since such a preservation is meaningless, the preservation flag is set to 0 to thereby clear the preserved value, and the orientation indicated by the operation panel 4 is preferentially used (flowchart of FIG. 6).

As described above, in the embodiment, when the paper feeding mode is changed to the optional paper feeding mode in the emulation command mode, the orientation can be automatically changed to landscape. On the other hand, when the command system or paper feeding mode is changed, the orientation can also be returned.

Another Embodiment

Even when orientation is set to the landscape, there are two kinds of vertical writing modes and lateral writing modes in Japanese.

The change between such two kinds of writing modes cannot be automatically controlled by the change of the paper feeding mode. However, a procedure such that the writing mode having a higher use frequency is preferentially designated can be preliminarily stored. On the other hand, in the case of returning, it is sufficient to set special areas for the vertical and lateral writing modes in the memory.

As described above, when the special paper feeding mode is selected, by automatically designating orientation to either the portrait or landscape, the works to not only designate the paper feeding mode but also manually select the orientation can be omitted.

The present invention is not limited to the foregoing embodiments, many modifications and variations are possible within the spirit and scope of the appended claims of the invention.

What is claimed is:

1. A recording apparatus comprising:

feeding means including standard feeding means for feeding a standard sheet and specific feeding means for feeding a specific sheet, said feeding means having two feeding modes, one of said modes being a standard mode for feeding the standard sheet by said standard feeding means and the other of said modes being a specific mode for feeding the specific sheet by said specific feeding means in an orientation able to be manually set;

recording means for recording a document onto a recording sheet fed lengthwise by said feeding means in the orientation of a portrait or a landscape, said recording means recording the document onto the recording sheet such that a column direction of the document is perpendicular to a feeding direction of the recording sheet in a case of the portrait orientation and the column direction of the document is parallel to the feeding direction of the recording sheet in a case of the landscape orientation; and control means for controlling the orientation of said recording means, wherein said recording means operates on the basis of a command system of a page printer and a command system of a line printer, wherein said control means, in accordance with an instruction for switching the feeding mode from the standard mode to the specific mode, switches the feeding mode and sets the orientation to the landscape irrespective of the orientation set in the standard mode when said recording means operates based on the command system of the line printer, and wherein said control means does not set the landscape orientation according to the instruction for switching the feeding mode, when said recording means operates based on the command system of the page printer.

2. An apparatus according to claim 1, wherein said specific feeding means includes envelope feeding means, and said control means sets the orientation of said recording means to the landscape when said envelope feeding means is used.

3. An apparatus according to claim 1, wherein said control means comprises memory means for storing the orientation, and said control means sets the present-time orientation to the orientation set in the previous-time standard mode stored in said memory means, in accordance with the instruction for switching the feeding mode from the specific mode to the standard mode.

4. An apparatus according to claim 1, wherein said recording means sets the orientation to the landscape orientation without waiting for the instruction for switching the orientation.

5. A recording system comprising:

(A) a recording apparatus having, (i) feeding means including standard feeding means for feeding a standard sheet and specific feeding means for feeding a specific sheet, said feeding means having two feeding modes, one of said modes being a standard mode for feeding the standard sheet by said standard feeding means and the other of said modes being a specific mode for feeding the specific sheet by said specific feeding means in an orientation able to be manually set, and (ii) recording means for recording a document onto a sheet material fed lengthwise by said feeding means in the orientation of a portrait or a landscape, said recording means recording the document onto the sheet material such that a column direction of the document is perpendicular to a feeding direction of the sheet in a case of the portrait orientation and the column direction of the document is parallel to the feeding direction of the sheet in a case of the landscape orientation;

(B) an information generating apparatus for generating information to be recorded by said recording apparatus;

(C) instruction means for instructing a desired feeding mode; and (D) control means for controlling the orientation of said recording means, wherein said recording means operates on the basis of a command system of a page printer and a command system of a line printer, wherein said control means, in accordance with the instruction by said instruction means for switching the feeding mode from the standard mode to the specific mode, switches the feeding mode and sets the orientation to the landscape irrespective of the orientation set in the standard mode, when said recording means operates based on the command system of the line printer, and wherein said control means does not set the landscape orientation according to the instruction for switching the feeding mode when said recording means operates based on the command system of the page printer.

6. A system according to claim 5, wherein said specific feeding means includes envelope feeding means, and said control means sets the orientation of said recording means to the landscape when said envelope feeding means is used.

7. A system according to claim 5, wherein said instruction means is included in said information generating apparatus.

8. A system according to claim 5, wherein said control means is included in said recording apparatus.

9. A system according to claim 5, wherein said control means has memory means for storing the orientation previously set in a case where the standard mode is selected, and said control means switches the feeding mode in accordance with the instruction by said instruction means for switching the feeding mode from the specific mode to the standard mode, and sets the present-time orientation to the orientation set in the previous-time standard mode stored in said memory means.

10. A system according to claim 5, wherein said control means comprises memory means for storing the manually-set orientation, and said control means sets the orientation based on the manually-set orientation in said memory means.

11. A system according to claim 10, wherein said memory means stores the orientation previously set in a case where said standard feeding means is selected.

12. An apparatus according to claim 5, wherein said recording means sets the orientation to the landscape orientation without waiting for the instruction for switching the orientation.

13. A method in a printer having a line printer mode for processing data generated from a host in a command system of a line printer and a page printer mode for processing the data generated from the host in a command system of a page printer, for setting a feeding mode, for lengthwise feeding including a standard mode and a specific mode, and an orientation mode, including a portrait mode and a landscape mode, wherein the standard mode feeds a standard sheet mounted on a standard sheet mount unit, the specific mode feeds a specific sheet mounted on a specific sheet mount unit, the portrait mode records a document on a sheet such that a column direction of the document is perpendicular to a feeding direction of the sheet, and the landscape mode records the document on the sheet such that the column direction of the document is parallel to the feeding direction of the sheet, said method comprising the steps of:

detecting an instruction for switching the feeding mode from the standard mode to the specific mode;

executing the switching of the feeding mode in according with the detection of the switching instruction in said detecting step; and setting the orientation mode to the landscape mode even if the orientation mode before the switching is the portrait mode, in accordance with the detection of the switching instruction in the line printer mode, wherein, in said setting step, if the switching instruction is detected in the page printer mode, the setting of the landscape mode according to the switching instruction is not performed.

14. A method according to claim 13, further comprising the steps of:

storing the orientation in the standard mode; and switching the feeding mode if the switching of the feeding mode from the specific mode to the standard mode is detected, and setting the orientation mode in the present-time standard mode to the orientation mode in the previous-time standard mode stored in said storing step.

15. A method according to claim 13, wherein the specific sheet includes an envelope.

16. A method according to claim 13, wherein said setting step sets the orientation mode to the landscape mode without waiting for the switching instruction of the orientation mode.

* * * * *

UNITED STATES PATENT AND TRADEMARK OFFICE

CERTIFICATE OF CORRECTION

PATENT NO. : 5,179,636

DATED : January 12, 1993

INVENTOR(S) : Katsuhiko Anzai

It is certified that error appears in the above-indentified patent and that said Letters Patent is hereby corrected as shown below:

On the Title Page

[56] REFERENCES CITED

"104794A1 4/1982 Fed. Rep. of Germany
327270A1 2/1984 Fed. Rep. of Germany" should read
--3104794A1 4/1982 Fed. Rep. of Germany
3327270A1 2/1984 Fed. Rep. of Germany--; and "159100A 11/1985 United Kingdom" should read
--2159100A 11/1985 United Kingdom--.

COLUMN 2

Line 42, "arrow 10" should read --arrow 10 in FIG. 2;--.
Line 57, "the" should be deleted.

COLUMN 3

Line 41, "be also be" should read --also be--.

UNITED STATES PATENT AND TRADEMARK OFFICE

CERTIFICATE OF CORRECTION

PATENT NO. : 5,179,636

DATED : January 12, 1993

INVENTOR(S) : Katsuhiko Anzai

It is certified that error appears in the above-indentified patent and that said Letters Patent is hereby corrected as shown below:

COLUMN 5

Line 22, "orientation" should read --the orientation- --; and "the" should be deleted.

Line 34, "orienta-" should read --the orienta--.

Line 35, "the" (first occurrence) should be deleted.

COLUMN 8

Line 18, "cording" should read --cordance--.

Signed and Sealed this

Tenth Day of May, 1994

Attest:

BRUCE LEHMAN

Attesting Officer

*Commissioner of Patents and Trademarks*